Oct. 16, 1962   A. C. HILLMEYER ET AL   3,059,066
EYEGLASS AND SELF-CONTAINED HEARING AID UNIT
Filed Dec. 8, 1955   2 Sheets-Sheet 1
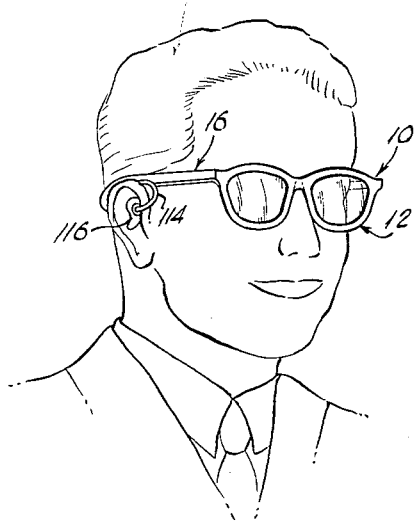
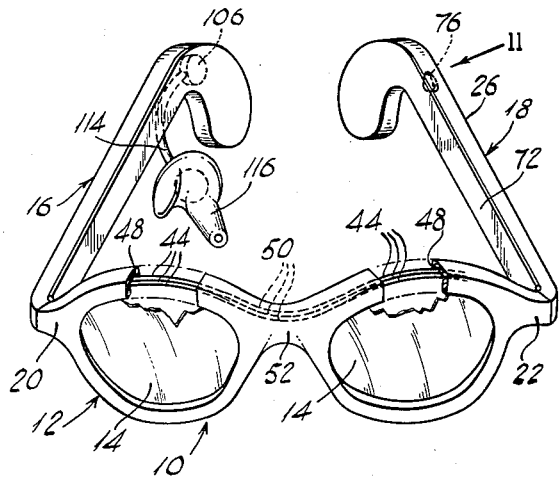
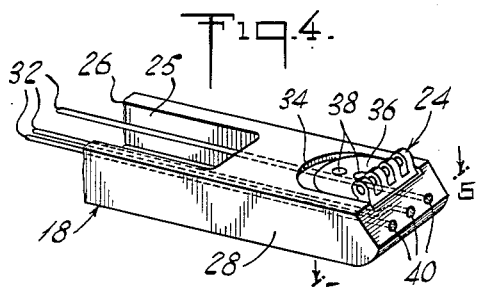
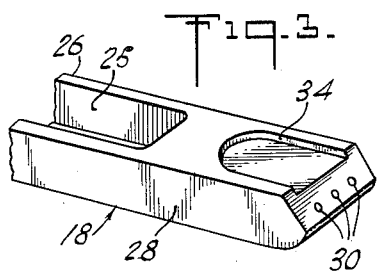
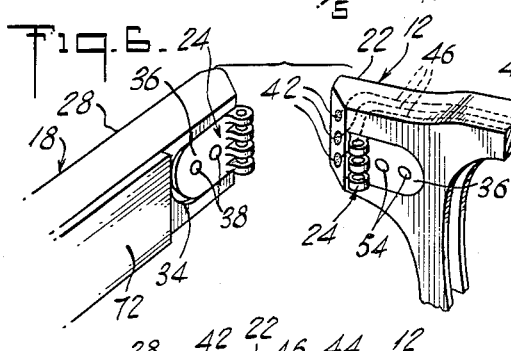
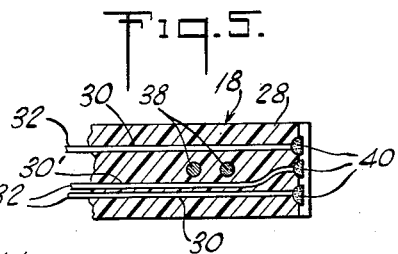
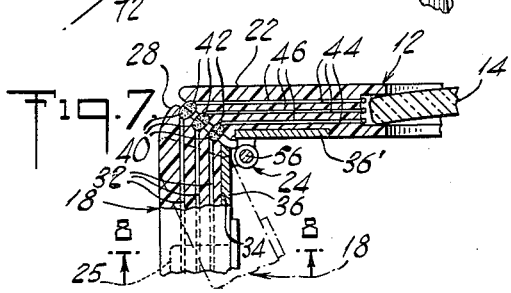
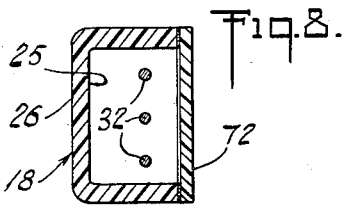
INVENTORS
ALBERT C. HILLMEYER
J. M. CALHOUN
BY
Henry L. Burkitt
ATTORNEY

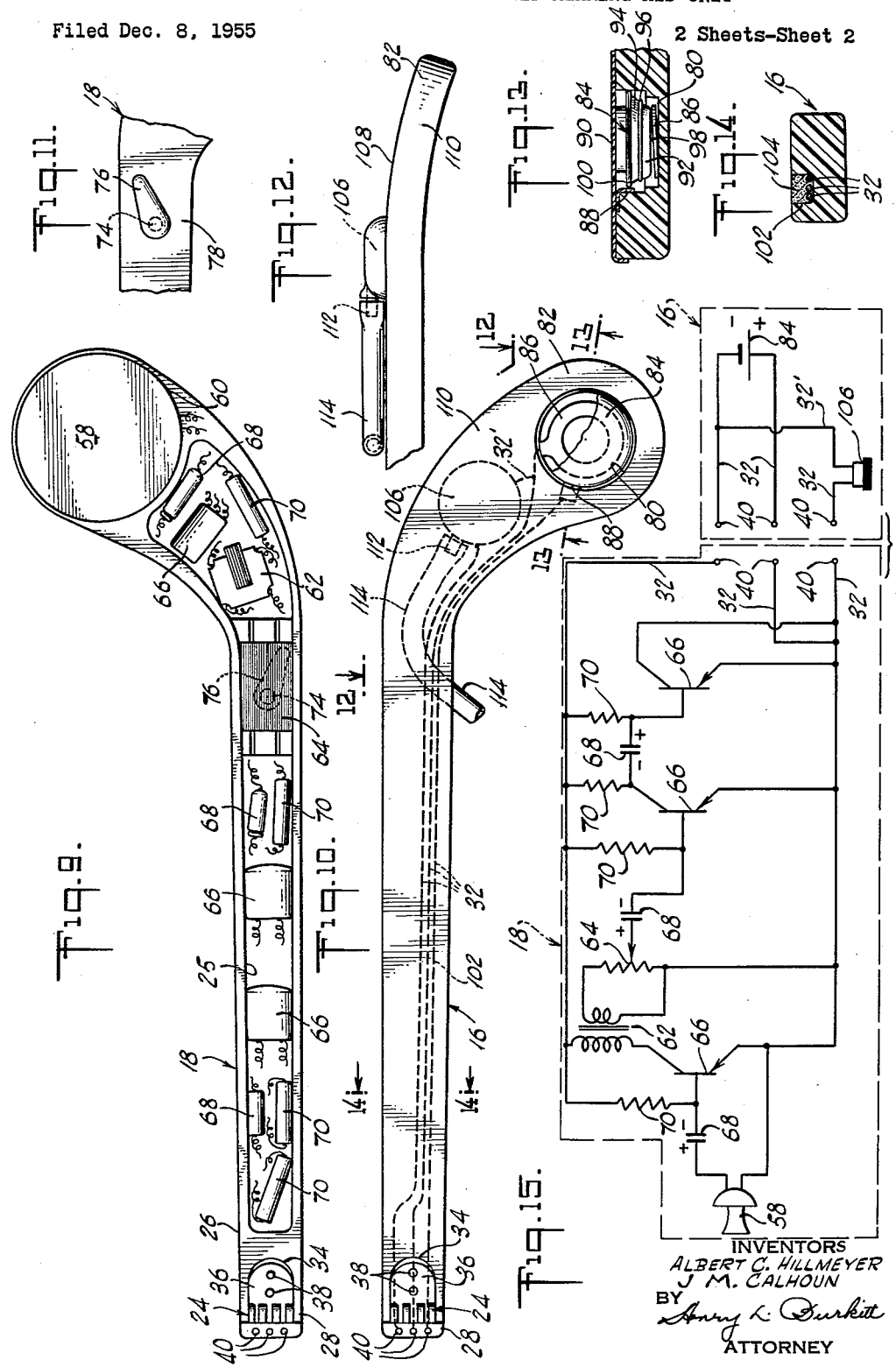

United States Patent Office 3,059,066
Patented Oct. 16, 1962

3,059,066
EYEGLASS AND SELF-CONTAINED
HEARING AID UNIT
Albert C. Hillmeyer and J. M. Calhoun, Houston, Tex., assignors to Otarion, Inc., Dobbs Ferry, N.Y., a corporation of New York
Filed Dec. 8, 1955, Ser. No. 551,831
3 Claims. (Cl. 179—107)

This invention relates to an eyeglass and self-contained hearing aid unit.

An object of the present invention is the provision of combination eyeglasses and hearing aid which is self-contained, of minimum bulk and weight, of attractive appearance, and which is efficient and reliable in operation. Pursuant to this object of the present invention all of the hearing aid components, except the ear piece and the air tube therefor, are housed in the temples of the eyeglasses.

Another object of the present invention is the provision of combination eyeglasses and hearing aid having a volume control in the hearing aid circuit which is manually adjustable by a control device at one of the temples.

Another object of the present invention is the provision of combination eyeglasses and hearing aid of the aforenoted character in which the circuit through the hearing aid is opened and closed on the unfolding and folding, respectively, of the temples.

Other objects of the invention will be set forth hereinafter, or will be apparent from the description and the drawings, in which are illustrated embodiments exemplifying the invention.

The invention, however, is not intended to be restricted to any particular construction, or any particular arrangement of parts, or any particular application of any such construction or arrangement of parts, or any specific method of operation or use, or any of the various details thereof, even where specifically shown and described herein, as the same may be modified in various particulars, or may be applied in many varied relations, without departing from the spirit and scope of the claimed invention, of which the exemplifying embodiments, herein shown and described, are intended only to be illustrative, and only for the purpose of complying with the requirements of the statutes for disclosure of an operative embodiment, but not to show all the various forms and modifications in which the invention might be embodied.

On the drawings, in which the same reference characters refer to the same parts throughout, and in which are disclosed such practical constructions, FIG. 1 is a front perspective view of combination eyeglasses and hearing aid according to the present invention shown in position on a wearer;

FIG. 2 is a perspective view of the combination eyeglasses and hearing aid with parts broken away to reveal structural details;

FIG. 3 is a fragmentary perspective view of the hinged end of a temple prior to the wiring thereof and the securement thereto of a hinge plate;

FIG. 4 is a fragmentary perspective view of the hinged end of a temple in a finished state;

FIG. 5 is a sectional view taken on the line 5—5 of FIG. 4;

FIG. 6 is a fragmentary perspective view showing the details of construction at the hinged connection of a temple with the parts shown in disassembled relation;

FIG. 7 is a horizontal fragmentary sectional view of the hinged connection of a temple with the latter in its unfolded condition;

FIG. 8 is a sectional view, on an enlarged scale, taken on the line 8—8 of FIG. 7;

FIG. 9 is a side elevational view of one of the temples with the cover plate removed;

FIG. 10 is a side elevational view of the other temple;

FIG. 11 is a fragmentary side elevational view of one of the temples looking in the direction of arrow 11 in FIG. 2;

FIG. 12 is a view taken on the line 12—12 of FIG. 10;

FIG. 13 is a sectional view taken on the line 13—13 of FIG. 10;

FIG. 14 is a sectional view taken on the line 14—14 of FIG. 10; and

FIG. 15 is a wiring diagram of the hearing aid circuit.

Referring to the drawings in detail, there is shown in FIGS. 1 and 2 a pair of eyeglasses 10 comprising a frame part 12, which mounts lenses 14, and a pair of temples 16 and 18 which are hingedly mounted to the end portions 20 and 22, respectively, of said frame part by hinges 24. The eyeglasses 10 also form a housing and support for a hearing aid unit and to this end the temple 18 is in the form of a hollow housing or casing 26 with the temple 16 being of the construction to be described in detail hereinafter for mounting certain hearing aid components.

With reference to FIGS. 3–8, each of the temples has a structurally similar end part 28 which has three passages 30 for the extension therethrough of companion wires 32 and a recess 34 for the mounting therein of a hinge plate 36 by means of suitable rivets 38. As shown in FIG. 5, the center passage 30 has a laterally offset portion 30' which provides the requisite clearance for the rivets 38. The wires 32 terminate at the end part 28 in contacts 40 which are defined by solder portions which are heat sealed to said end part, the latter and the basic eyeglass frame being formed of a suitable plastic material which may be molded to shape. The end portions 20 and 22 are of similar construction and are provided with contacts 42 which are similarly defined as the contacts 40, said contacts 40 and 42 being disposed for mutual engagement, as shown in FIG. 7, in the unfolded condition of the temples to close the circuit through the hearing aid unit. Conversely the folding of one or both temples opens said circuit as the contacts 40 and 42 are disengaged. Each of the contacts 42 at end portion 20 is in circuit with a companion contact 42 at the opposite end portion 22 by the wires 44, it being noted that the hearing aid circuit is of the 3-wire type.

The wires 44 extend along the frame part 12 and electrically interconnect the circuit components of the temples when the latter are in their unfolded or extended condition. Each of the end portions 20 and 22 is provided with passages 46 which extend to the lens grooves 48 for the extension therethrough of the wires 44, the latter extending along said grooves and through the passages 50 of the bridge piece 52. The wires 44 are adhesively secured in position along the lens grooves adjacent to the rims of the lenses 14. Secured to the end portions 20 and 22, in recessed relation therewith, are hinge plates 36' which are retained in position by rivets 54. Each hinge plate 36' is secured to a companion hinge plate 36 by a screw or hinge pin 56 to provide for the pivotal connection of the temples to the frame part 12. Thus the wires 32 of one temple are in circuit with companion wires 32 of the other temple through the wires 44 of the frame part 12 when the temples are in their extended condition.

With reference to FIGS. 7–9, the temple 18 has a microphone 58 secured to the free end thereof in any suitable manner, such as by means of a suitable adhesive along the line of securement 60, and mounted in the longitudinal recess or compartment 25 of casing 26 of said temple are a transformer 62, a volume control 64, transistors 66, condensers 68, resistors 70, and associated wiring. These components form the amplifier of the hearing aid circuit and the wiring diagram for such components is shown in FIG. 15. The casing 26 is closed by the cover member 72 which is adhesively secured in position and which terminates adjacent to the hinge plate 36. (See FIGS. 6 and 8.) Accordingly the cover member 72 overlies the amplifier components and closes the compartment 25 housing said components.

The volume control 64 is suitably secured in position in compartment 25 and includes a rotary operating shaft 74 to which is secured the manually operable control lever 76 (FIG. 11) at the side face 78 of the temple, said lever being readily accessible and pivotally movable to adjust the hearing aid volume.

With reference to FIGS. 10, 12, 13 and 14, the temple 16 has a cavity 80 at the free end portion 82 thereof for the reception of a suitable battery 84 which is the power supply for the hearing aid. Secured at the base of cavity 80 is a spring contact plate 86 and at a peripheral portion of said cavity is a contact 88, said plate and contact being in circuit with the opposite poles of the battery which is retained in said cavity by a strip 90 of adhesive tape. The battery 84 is of conventional construction and comprises a pair of shells 92 and 94 which are secured together with insulation 96 disposed therebetween, the face 98 of shell 92 forming a contact surface in engagement with contact plate 86 and the peripheral edge 100 of shell 94 forming the other contact surface which engages the contact 88. The wires 32 extend longitudinally of temple 16 in the slot 102 thereof and are adhesively secured in position in said slot as indicated at 104 (FIG. 14), said adhesive filling said slot. Two of the wires 32 are power supply leads and are connected to the contact plate 86 and contact 88 at the free end of the temple and the third wire 32 is connected to the receiver 106 which is adhesively secured to the outer side face 108 of the temple at the ear piece 110 thereof in the region of the battery. The receiver is connected to one of the battery leads by wire 32'.

The receiver 106 includes a fitting 112 to which is attached a flexible air tube 114 which extends along the temple, externally thereof, and terminates in a suitable ear piece 116 (FIGS. 1 and 2). The ear piece 116 is accordingly disposed for positioning in the wearer's ear with a minimum air tube length.

With reference to FIG. 15, there is shown the wiring diagram of the hearing aid circuit, the amplifier components being disposed in temple 18 and the receiver and battery being disposed in temple 16. The circuit is of the 3-wire type and is closed through the engaged contacts 40 and 42 of the temple and frame part, respectively, when the temples are in their extended disposition. The circuit integration of the various components described above is clearly indicated on the circuit diagram.

Many other changes could be effected in the particular constructions, and in the methods of use and construction, and in specific details thereof, hereinbefore set forth, without substantially departing from the invention intended to be defined herein, the specific description being merely of embodiments capable of illustrating certain principles of the invention.

What is claimed as new and useful is:

1. Combination eyeglasses and hearing aid, comprising a frame part, a pair of temples connected to the frame part at the opposite ends thereof, hearing aid components disposed in the temples and interconnected in circuit relation, said components comprising a microphone disposed in one temple, a receiver disposed in the other temple, and electronic amplifying means disposed in the temples, electrically conducting means extending longitudinally of said frame part for electrically connecting in circuit the microphone in one temple and the receiver in the other temple with said electronic amplifying means, and means for connecting said hearing aid components of each of said temples in circuit with said conducting means to complete a circuit through said hearing aid components, said conducting means comprising a plurality of conducting wires extending between the opposite ends of said frame part, the latter having passage means extending through the bridge piece and end portions thereof for the extension therethrough of said conducting wires, said frame part having peripheral lens grooves in communication with said passage means, whereby said conducting wires extend along said grooves between said bridge piece passage means and said end portion passage means, respectively.

2. Combination eyeglasses and hearing aid, comprising a frame part, a pair of temples pivotally connected to the frame part at the opposite ends thereof, said frame part having a bridge piece interconnecting a pair of lens frames, the latter having peripheral lens mounting grooves, passage means extending through said bridge piece and the end portions of said frame part in communication with said grooves, fixed contacts at the opposite ends of said frame part, conducting wires for interconnecting companion contacts at said opposite frame part ends, said conducting wires extending longitudinally of said frame part through said passage means and along said grooves, hearing aid components disposed in each temple, and the latter having fixed contacts at the inner end thereof disposed to engage said first mentioned fixed contacts on the pivotal movement of said temples to an extended disposition, whereby to close a circuit through said frame part and said hearing aid components.

3. Combination eyeglasses and hearing aid, comprising a frame part, a pair of temples pivotally connected to the frame part at the opposite ends thereof, said frame part having a bridge piece interconnecting a pair of lens frames, the latter having peripheral lens mounting grooves, passage means extending through said bridge piece and the end portions of said frame part in communication with said grooves, fixed contacts at the opposite ends of said frame part, conducting wires for interconnecting companion contacts at said opposite frame part ends, said conducting wires extending longitudinally of said frame part through said passage means and along said grooves, hearing aid components disposed in each temple, and the latter having fixed contacts at the inner end thereof disposed to engage said temples to an extended disposition, whereby to close a circuit through said frame part and said hearing aid components, said hearing aid components including a manually adjustable volume control housed in one of the temples, and actuating means for the volume control accessible at the outside face of said one temple.

References Cited in the file of this patent

UNITED STATES PATENTS

| | | |
|---|---|---|
| 2,207,705 | Cox | July 16, 1940 |
| 2,613,282 | Scaife | Oct. 7, 1952 |
| 2,725,462 | Vorgang | Nov. 29, 1955 |
| 2,765,373 | Smith | Oct. 2, 1956 |
| 2,830,132 | Borg | Apr. 8, 1958 |
| 2,930,857 | Hollingsworth | Mar. 29, 1960 |

FOREIGN PATENTS

| | | |
|---|---|---|
| 491,677 | Great Britain | Sept. 7, 1938 |
| 840,622 | France | Apr. 28, 1939 |
| 723,981 | Great Britain | Feb. 16, 1955 |
| 737,115 | Great Britain | June 27, 1955 |